(12) United States Patent
Nishimatsu et al.

(10) Patent No.: US 11,796,138 B2
(45) Date of Patent: Oct. 24, 2023

(54) INDICATOR LIGHT

(71) Applicant: PATLITE CORPORATION, Osaka (JP)

(72) Inventors: Kazuya Nishimatsu, Osaka (JP); Masao Tomimoto, Osaka (JP)

(73) Assignee: PATLITE CORPORATION, Osaka (JP)

( * ) Notice: Subject to any disclaimer, the term of this patent is extended or adjusted under 35 U.S.C. 154(b) by 0 days.

(21) Appl. No.: 18/016,239

(22) PCT Filed: Nov. 30, 2020

(86) PCT No.: PCT/JP2020/044484
§ 371 (c)(1),
(2) Date: Jan. 13, 2023

(87) PCT Pub. No.: WO2022/113339
PCT Pub. Date: Jun. 2, 2022

(65) Prior Publication Data
US 2023/0272889 A1 Aug. 31, 2023

(51) Int. Cl.
F21K 9/66 (2016.01)
F21K 9/61 (2016.01)
(Continued)

(52) U.S. Cl.
CPC ............. F21K 9/66 (2016.08); F21K 9/61 (2016.08); F21K 9/69 (2016.08); G02B 3/0037 (2013.01); F21W 2111/00 (2013.01)

(58) Field of Classification Search
CPC . F21V 5/046; F21V 5/045; F21V 5/04; F21K 9/66; F21K 9/61; F21K 9/69; F21K 9/232; G02B 3/0037; F21W 2111/00
(Continued)

(56) References Cited

U.S. PATENT DOCUMENTS 7,445,360 B2  11/2008  Ikeda
9,557,014 B2   1/2017  Shigematsu
(Continued)

FOREIGN PATENT DOCUMENTS

CN    105443996 A    3/2016
EP      4056891 A1   9/2022
(Continued)

Primary Examiner — Laura K Tso
(74) Attorney, Agent, or Firm — Rabin & Berdo, P.C.

(57) ABSTRACT

An indicator light (1) includes a light source, a lens (4), and a cylindrical globe (5). The light source includes a center LED (2A) disposed on a disposition surface parallel to a central axis (C1) and having an optical axis perpendicular to the disposition surface and a pair of side LEDs (2B, 2C). The lens includes a central lens portion (4A) and a pair of side lens portions (4B, 4C). The central lens portion emits light to a central radiation angle range (A1) centering on a central light-emission reference line (L1) along a reference normal line (BN) of the disposition surface. The pair of side lens portions (2B, 2C) emit light to a pair of side radiation angle ranges (A2, A3), respectively, that contain a pair of side light-emission reference lines (L2, L3), respectively, that are inclined mutually-opposite directions at an inclined angle of 60° with respect to the central light-emission reference line (L1). The central lens portion includes a central light incidence portion (32) having a central incidence surface (31) on which light from the central LED is made incident and a plurality of central light guiding portions (33) that branch from the central light incidence portion in the shape of branches and that extend toward the globe side. In each of the central light guiding portions, light that has been refracted and has been made incident from a corresponding incidence region of the central incidence surface onto the corresponding central emission surface is refracted and emitted from the corresponding central emission surface
(Continued)

toward a corresponding region of the central radiation angle range.

11 Claims, 13 Drawing Sheets

(51) Int. Cl.
*F21K 9/69* (2016.01)
*G02B 3/00* (2006.01)
*F21W 111/00* (2006.01)

(58) Field of Classification Search
USPC .................................................. 362/311.02
See application file for complete search history.

(56) References Cited

U.S. PATENT DOCUMENTS

| | | | | |
|---|---|---|---|---|
| 10,309,595 | B1* | 6/2019 | Datz | ..................... F21S 10/023 |
| 11,268,675 | B2 | 3/2022 | Tomimoto | |
| 2017/0276319 | A1 | 9/2017 | Shigematsu | |
| 2023/0020496 | A1* | 1/2023 | Tone | ......................... F21V 5/02 |

FOREIGN PATENT DOCUMENTS

| | | |
|---|---|---|
| JP | 2012-099243 A | 5/2012 |
| JP | 2012-209049 A | 10/2012 |
| JP | 2016-184532 A | 10/2016 |
| KR | 10-1051056 B1 | 7/2011 |
| WO | 2017/022143 A1 | 2/2017 |

* cited by examiner

FIG. 1A
FIG. 1B
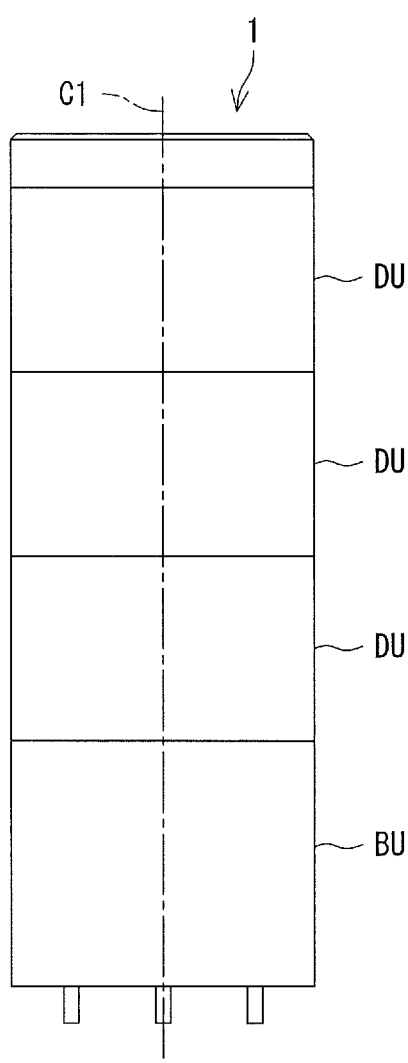
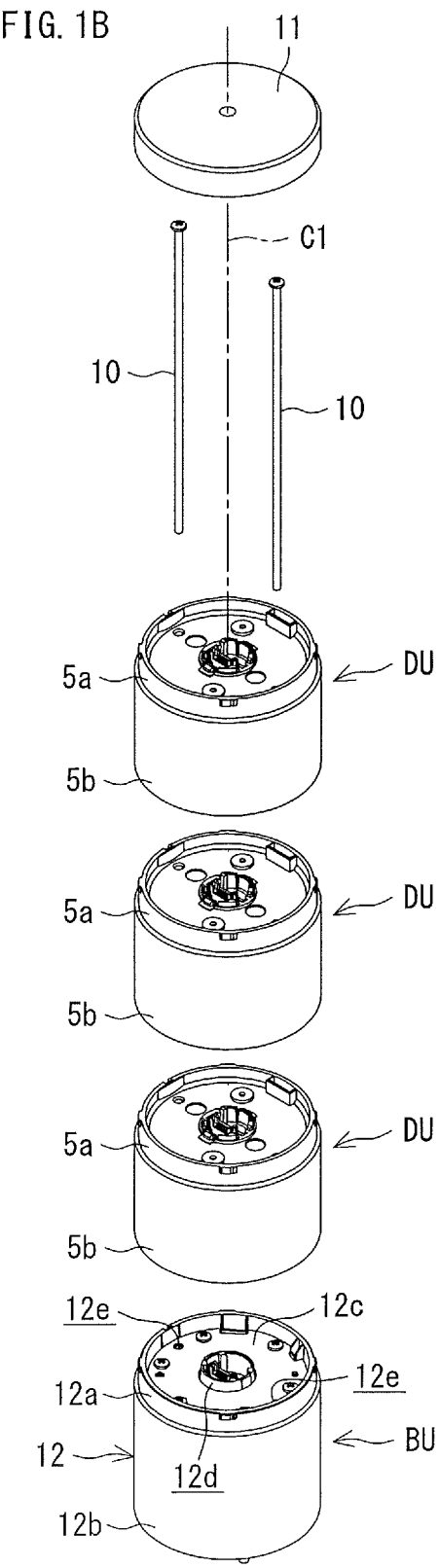

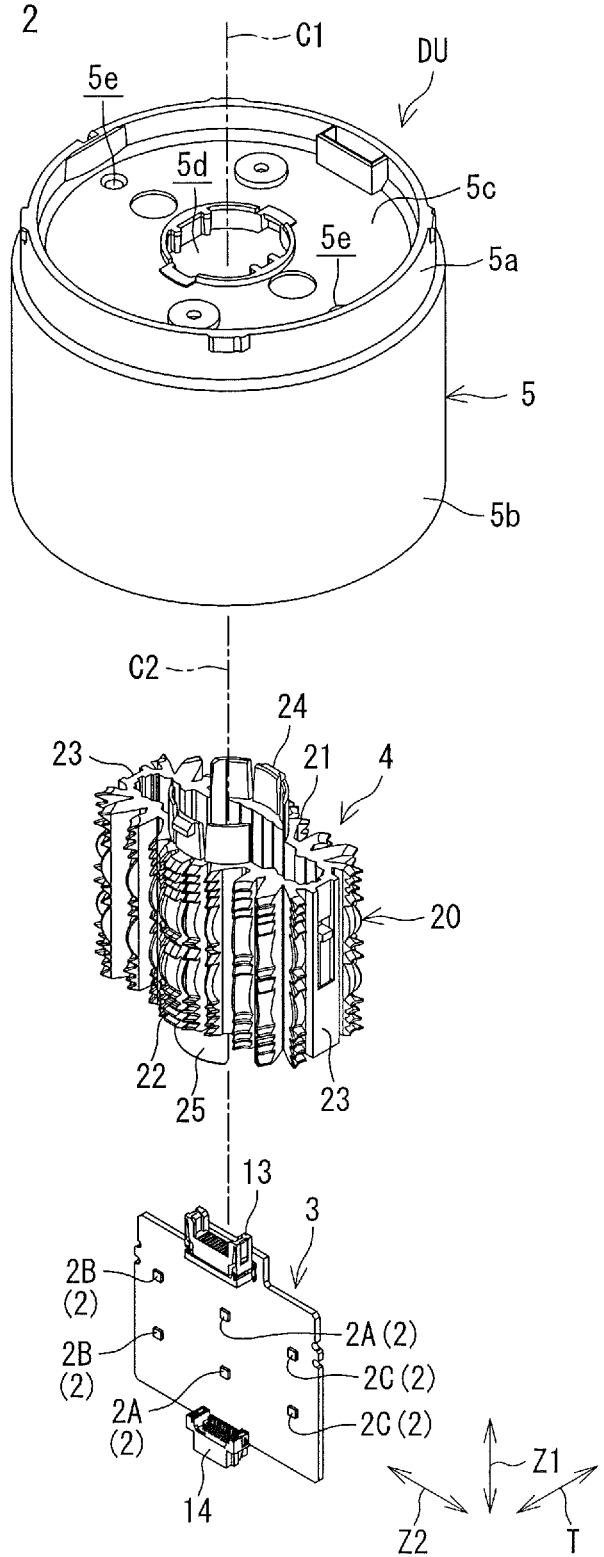

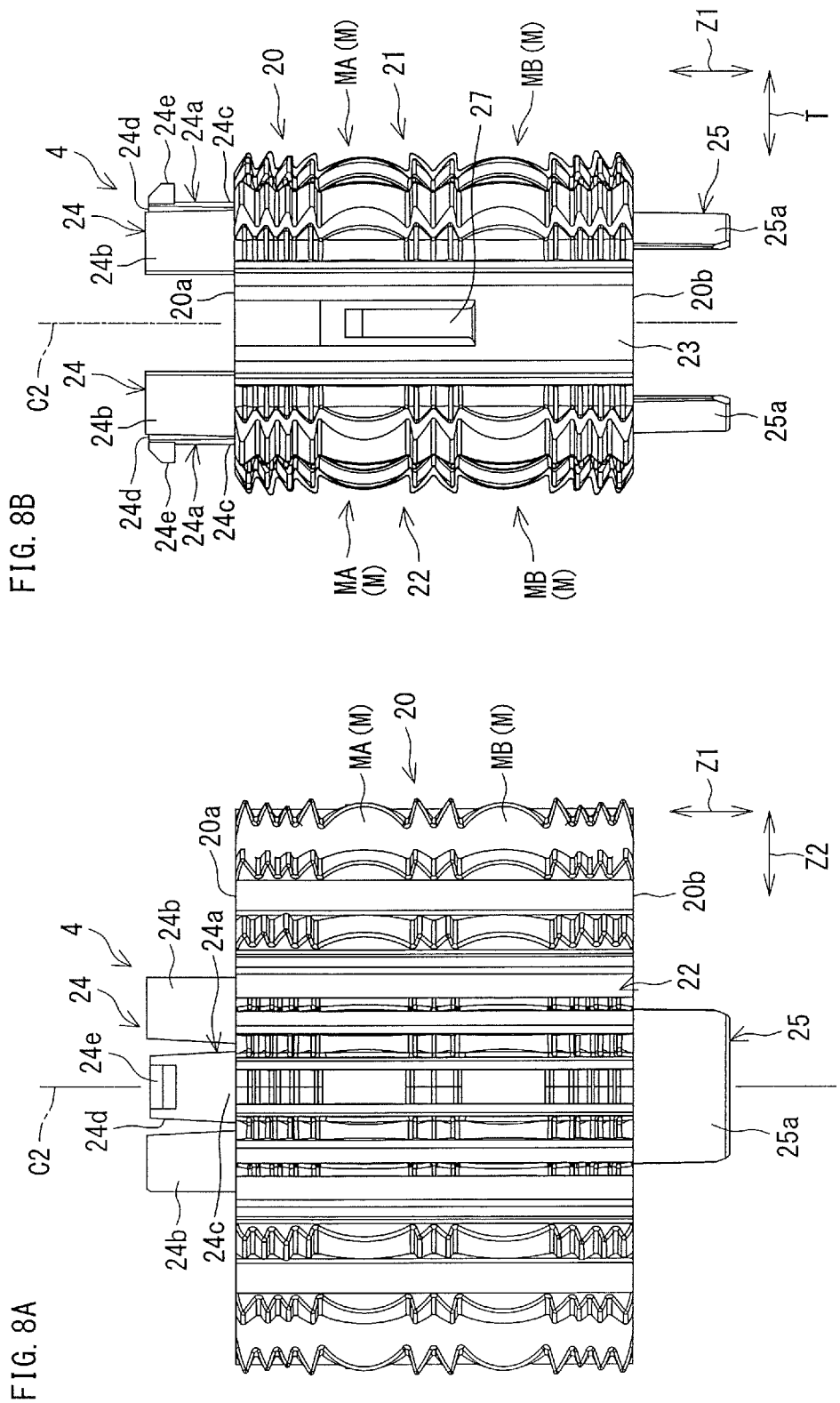

INDICATOR LIGHT

TECHNICAL FIELD

The present invention relates to an indicator light.

In a light emitting device disclosed by Patent Literature 1, a substrate parallel to a central axis of a substantially circular cylindrical cover (globe) is surrounded by a lens. Light from two LEDs disposed on both surfaces of the substrate is emitted to its entire periphery through the lens. In other words, the single LED is adapted for a radiation angle range of 180 degrees.

CITATION LIST

Patent Literature

Patent Literature 1: WO2017/022143

SUMMARY OF INVENTION

Technical Problem

Let it be supposed that radiation light from each of the LEDs is emitted to a corresponding region in a circumferential direction of the globe through a corresponding lens portion by use of three LEDs arranged in a direction perpendicular to the central axis of the circular cylindrical globe in response to a request to emit brighter light. The distance from the LED, which is closer to the central axis, to the globe is longer than the distance from the LED, which is farther from the central axis, to the globe. Therefore, there is a concern that a difference in light intensity will occur depending on the position in the circumferential direction of the globe, and light cannot be uniformly emitted with respect to the circumferential direction.

A preferred embodiment of the present invention provides an indicator light that is capable of emitting bright light that is uniform in a circumferential direction.

Solution to Problem

A preferred embodiment of the present invention provides an indicator light that radially emits light away from a central axis toward a periphery of the central axis. The indicator light includes a support member including a disposition surface parallel to the central axis and a light source including a central LED and a pair of side LEDs. The central LED is disposed on a reference normal line that is a normal line with respect to the disposition surface in the disposition surface and that extends through the central axis. The central LED includes an optical axis perpendicular to the disposition surface. The pair of side LEDs are disposed on both sides between which the central LED is interposed at mutually equal distances from the central LED in an intersection portion between an orthogonal flat surface that includes the reference normal line and that is perpendicular to the central axis and the disposition surface. The pair of side LEDs each includes an optical axis perpendicular to the disposition surface. The indicator light additionally includes a lens including a central lens portion and a pair of side lens portions. The central lens portion allows light from the central LED to be made incident and emits light into a central radiation angle range that is a radiation angle range determined by a central angle centering on the central axis and that centers on a central light-emission reference line along the reference normal line. The pair of side lens portions include side incidence surfaces, respectively, on which radiation light from the corresponding side LED is made incident and emit light into a pair of side radiation angle ranges, respectively, containing a pair of side light-emission reference lines, respectively, that are inclined mutually-opposite directions at an inclined angle of 60° with respect to the central light-emission reference line on the orthogonal flat surface. The indicator light additionally includes a cylindrical or a partially cylindrical translucent globe that surrounds the support member and the lens and that centers on the central axis. The central lens portion includes a central light incidence portion having a central incidence surface on which light from the central LED is made incident and a plurality of central light guiding portions that branch from the central light incidence portion in a shape of branches and that extend toward a side of the globe in the central radiation angle range. Each of the central light guiding portions includes a central emission end portion having a central emission surface that emits light to the side of the globe in the central radiation angle range. In each of the central light guiding portions, light that has been refracted and has been made incident from a corresponding incidence region of the central incidence surface onto the corresponding central emission surface is refracted and emitted from the corresponding central emission surface toward a corresponding region of the central radiation angle range.

In this indicator light, the central LED and the pair of side LEDs are used, and, as a result, it becomes possible to emit light having high light intensity. On the other hand, the distance from the central LED to the globe is longer than the distance from the side LEDs to the cylindrical globe, and therefore the light intensity of the central radiation angle range is liable to become lower than the light intensity of the side radiation angle ranges. Therefore, in this indicator light, radiation light from the central LED is emitted to the central radiation angle range by use of only refraction by each of the central light guiding portions. Therefore, it is possible to bring the length of the optical path from the central LED to the globe close to the length of the optical path from the side LEDs to the globe by shortening the length of the optical path from the central LED to the globe. This makes it possible to emit light that is uniform and bright with respect to the circumferential direction.

In a preferred embodiment, the plurality of central light guiding portions include a central primary light guiding portion that contains the central light-emission reference line and that emits emission light parallel to the central light-emission reference line and a pair of central secondary light guiding portions that are disposed on both sides between which the central primary light guiding portion is interposed when seen in parallel with the central axis and that emit diffusion emission light that is diffused in a circumferential direction of the globe.

In this preferred embodiment, radiation light from the central LED is emitted to the central radiation angle range through the central lens portion. The central lens portion includes the plurality of central light guiding portions that branch from the central light incidence portion in the shape of branches, and the plurality of central light guiding portions include the central primary light guiding portion and the pair of central secondary light guiding portions on both sides of the central primary light guiding portion. This makes it possible to raise light intensity and to emit light uniformly with respect to the circumferential direction in the central radiation angle range.

In a preferred embodiment, in the central radiation angle range, a pair of regions corresponding to the pair of central secondary light guiding portions are disposed on both sides between which a region corresponding to the central primary light guiding portion is interposed. In this preferred embodiment, radiation light from the central LED is excellently distributed into the central radiation angle range.

In a preferred embodiment, the pair of central secondary light guiding portions include a pair of central adjacent secondary light guiding portions disposed on both sides between which the central primary light guiding portion is interposed and a pair of central distant secondary light guiding portions disposed on both sides between which the pair of central adjacent secondary light guiding portions are interposed, and, in the central radiation angle range, a pair of regions corresponding to the pair of central distant secondary light guiding portions are disposed on both sides between which a region corresponding to the pair of central adjacent secondary light guiding portions is interposed. In this preferred embodiment, the pair of central secondary light guiding portions include the pair of central adjacent secondary light guiding portions and the pair of central distant secondary light guiding portions. This makes it possible to equalize the thickness of each of the secondary light guiding portions that have the shape of branches when seen in parallel with the central axis, and makes it possible to improve moldability.

In a preferred embodiment, each of the side lens portions includes a side light incidence portion having the side incidence surface on which light from the corresponding side LED is made incident and a plurality of side light guiding portions that branch from the side light incidence portion and that extend toward the side of the globe in the corresponding side radiation angle range. Each of the side light guiding portions includes a side base end portion that is united with the corresponding side light incidence portion, a side emission end portion having a side emission surface that emits light to the side of the globe in the corresponding side radiation angle range, and a light-guide reflection surface that guides light that has been made incident on the side base end portion from a corresponding incidence region of the corresponding side incidence surface onto the side emission end portion while performing internal reflection.

In this preferred embodiment, radiation light from each of the side LEDs is emitted to the corresponding side radiation angle ranges through the corresponding side lens portions. Each of the side light guiding portions of each of the side lens portions guides light by use of internal reflection by means of the light-guide reflection surface. Therefore, it is possible to lengthen an optical path length from each of the side LEDs to the globe through the corresponding side lens portions, and, as a result, it is possible to reduce a difference in optical path length at the center and the side with respect to the optical path length from the LED to the globe. This makes it possible to emit light uniformly with respect to the circumferential direction.

In a preferred embodiment, the plurality of side light guiding portions include a side primary light guiding portion that contains the corresponding side light-emission reference line and that emits emission light parallel to the corresponding side light-emission reference line and a pair of side secondary light guiding portions that are disposed on both sides between which the corresponding side primary light guiding portion is interposed when seen in parallel with the central axis and that emit diffusion emission light that is diffused in the circumferential direction of the globe. In this preferred embodiment, radiation light from each of the side LEDs is excellently distributed into the corresponding side radiation angle range.

In a preferred embodiment, a distance from the central LED to the central incidence surface is made longer than a distance from each of the side LEDs to the corresponding side incidence surface, and the lens includes a pair of inclined connection portions that connect the central light incidence portion and each of the side light incidence portions together and that are inclined mutually-opposite directions with respect to the disposition surface when seen in parallel with the central axis. In this preferred embodiment, a configuration to make the distance from the LED to the lens portion (incidence surface) differ at the center and the side can be achieved by a practicable structure.

In a preferred embodiment, a central irradiation angle range that is an irradiation angle range occupied by the central incidence surface of an irradiation angle range of light from the central LED and a side irradiation angle range that is an irradiation angle range occupied by the corresponding side incidence surface of an irradiation angle range of light from each of the side LEDs are set to be equal in magnitude to each other when seen in parallel with the central axis. In this preferred embodiment, the central irradiation angle range corresponding to the central LED and the side irradiation angle range corresponding to each of the side LEDs are set to be equal in magnitude to each other, and, as a result, it is possible to emit light uniformly in the circumferential direction by effectively using radiation light from each of the LEDs.

In a preferred embodiment, the support member includes a substrate that has a pair of disposition surfaces in mutually-opposite directions on a front and a rear of the substrate, and the light source is disposed at a line-symmetric position with respect to a reference line that passes through the central axis and that is parallel to the pair of disposition surfaces when seen in parallel with the central axis, and the lens has a line-symmetric shape with respect to the reference line. In this preferred embodiment, it is possible to realize an indicator light that evenly emits light in all directions while using a practicable configuration.

In a preferred embodiment, the central radiation angle range and each of the side radiation angle ranges are away from each other in the circumferential direction around the central axis. In this preferred embodiment, it is possible to suitably use the indicator light as a pseudo-rotating lamp.

In a preferred embodiment, the globe has a partially cylindrical shape in which the disposition surface serves as a chord when seen in parallel with the central axis. In this preferred embodiment, it is possible to suitably use the indicator light as an indicator light that evenly emits light to a range of 180°.

BRIEF DESCRIPTION OF DRAWINGS

FIG. 1A is a front view of an indicator light according to a preferred embodiment of the present invention, and FIG. 1B is an exploded perspective view of the indicator light.

FIG. 2 is an enlarged, exploded perspective view of a main part of the indicator light.

FIG. 8A is a front view of the lens, and FIG. 8B is a side view of the lens.

DESCRIPTION OF EMBODIMENTS

Figure 3A:
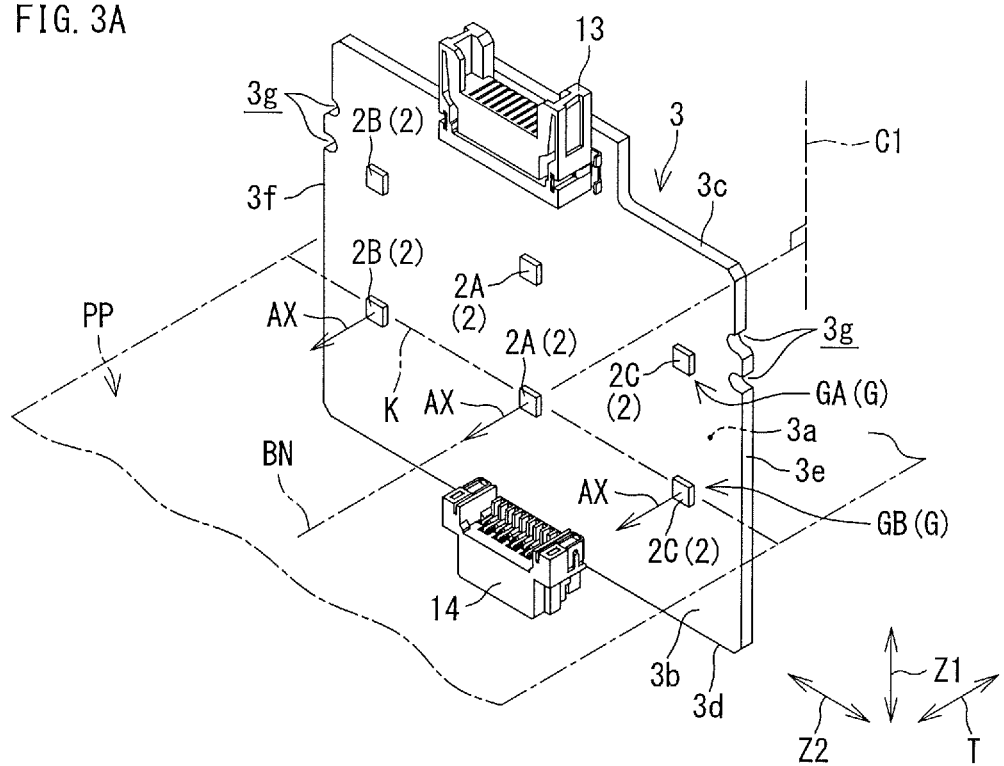
FIG. 3A and FIG. 3B are perspective views of a substrate seen from mutually different angles.

A preferred embodiment that has embodied the present invention will be hereinafter described with reference to the drawings.

FIG. 1A is a front view of an indicator light 1 according to the preferred embodiment of the present invention, and FIG. 1B is an exploded perspective view of the indicator light 1.

With reference to FIG. 1A and FIG. 1B, the indicator light 1 according to a preferred embodiment of the present invention is used in a manufacturing site, etc., of a factory and formed in a long and thin cylindrical shape. The posture of the indicator light 1 assumed when used can be arbitrarily set in accordance with use conditions. However, for convenience, the following description will be given on the basis of the indicator light 1 disposed in a vertically-long manner so that the up-down direction of the plane of a sheet of paper in each of FIGS. 1A and 1B coincides with the longitudinal direction of the indicator light 1. Specifically, a description will be given on the supposition that the upper side of the plane of paper is the upper side of the indicator light 1, and the lower side of the plane of paper is the lower side of the indicator light 1 in each of FIGS. 1A and 1B.

With reference to FIG. 1A and FIG. 1B, the indicator light 1 includes a plurality of display units DU, a base unit BU that supplies electric power to the plurality of display units DU, a pair of fixing shafts 10, and a head cover 11. In the indicator light 1, the plurality of display units DU are stacked together in the up-down direction. The plurality of display units DU are fastened to the base unit BU through the fixing shaft 10 that extends through the plurality of stacked display units DU. The head cover 11 is fitted to an upper end of the uppermost display unit DU.

The indicator light 1 has a cylindrical shape whose center is a central axis C1 extending in the up-down direction. In the indicator light 1, each of the display units DU emits light radially so that light radiates away from the central axis C1 toward the space around the central axis C1 (see FIG. 5).

FIG. 2 is an exploded perspective view of the display unit DU. As shown in FIG. 2, each of the display units DU includes a substrate 3 on which a plurality of LEDs (light emitting diodes) 2 serving as a light source are mounted, a lens 4, and a globe 5. The LED 2 includes a central LED 2A and side LEDs 2B and 2C.

Figure 4:
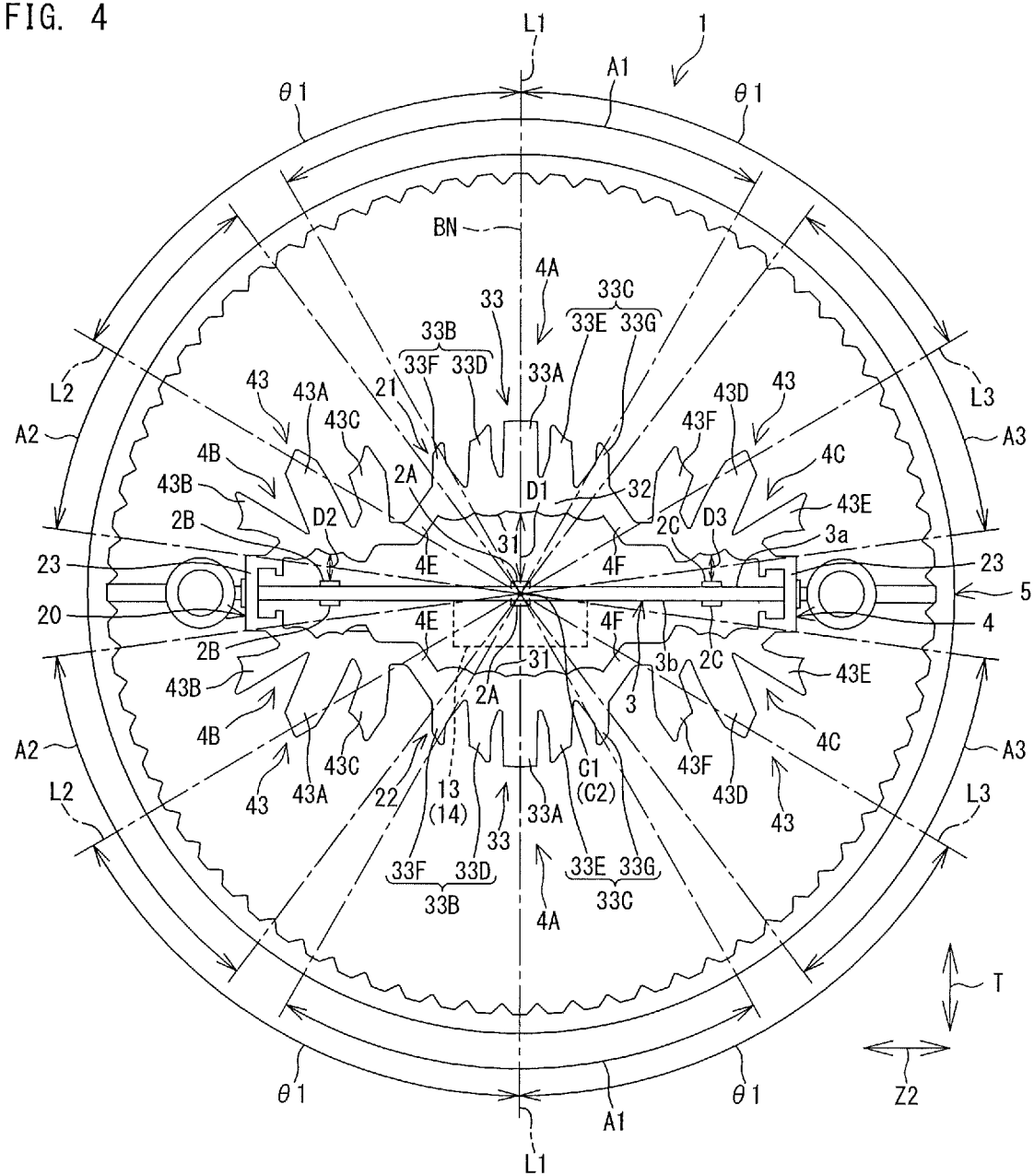
FIG. 4 is a schematic cross-sectional view of the indicator light showing a radiation angle range from each LED.

The globe 5 has a cylindrical shape, and is disposed so as to contain the lens 4 (see FIG. 4 as a cross-sectional view of the indicator light 1). The central axis C1 of the indicator light 1 corresponds to a central axis of the globe 5. The globe 5 is made of a transparent material (including a semi-transparent material or colored transparent material), and transmits light passing through the lens 4 from the LED 2 toward a surrounding area. As shown in the drawings, the globe 5 may have lens cut portions formed to diffuse radiation light in a circumferential direction.

As shown in FIG. 2, the globe 5 includes an upper end 5a that has been reduced in diameter and that forms a fitting convex portion, a lower end 5b as an open end, and an end wall portion 5c that closes the inside of the upper end 5a. A support hole 5d into which an upper end of the lens 4 is inserted and fitted and is supported and a through-hole 5e into which each of the fixing shafts 10 is inserted are formed in the end wall portion 5c.

As shown in FIG. 1B, the head cover 11 is a cylindrical container opened downwardly. The upper end 5a of the globe 5 of the uppermost display unit DU (see FIG. 2) is inserted and fitted from below into the lower end of the head cover 11. Additionally, in the display units DU adjoining each other in the up-down direction, the upper end 5a of the globe 5 of the display unit DU on the lower side is inserted and fitted into the lower end 5b of the globe 5 of the display unit DU on the upper side.

As shown in FIG. 1B, the base unit BU has a cylindrical body 12. The body 12 includes an upper end 12a that has been reduced in diameter and that provides a fitting convex portion, a lower end 12b, and an end wall portion 12c that closes the inside of the upper end 12a. The upper end 12a of the body 12 is inserted and fitted into the lower end 5b of the globe 5 of the lowermost display unit DU. The end wall portion 12c has a cylindrical boss 12d formed so as to protrude. The boss 12d is inserted and fitted into a lower end of the lens 4 of the lowermost display unit DU united with the base unit BU. Additionally, the end wall portion 12c has a fixing hole 12e into which a lower end of the fixing shaft 10 is inserted.

Next, the substrate 3 will be described.

Figure 3B:
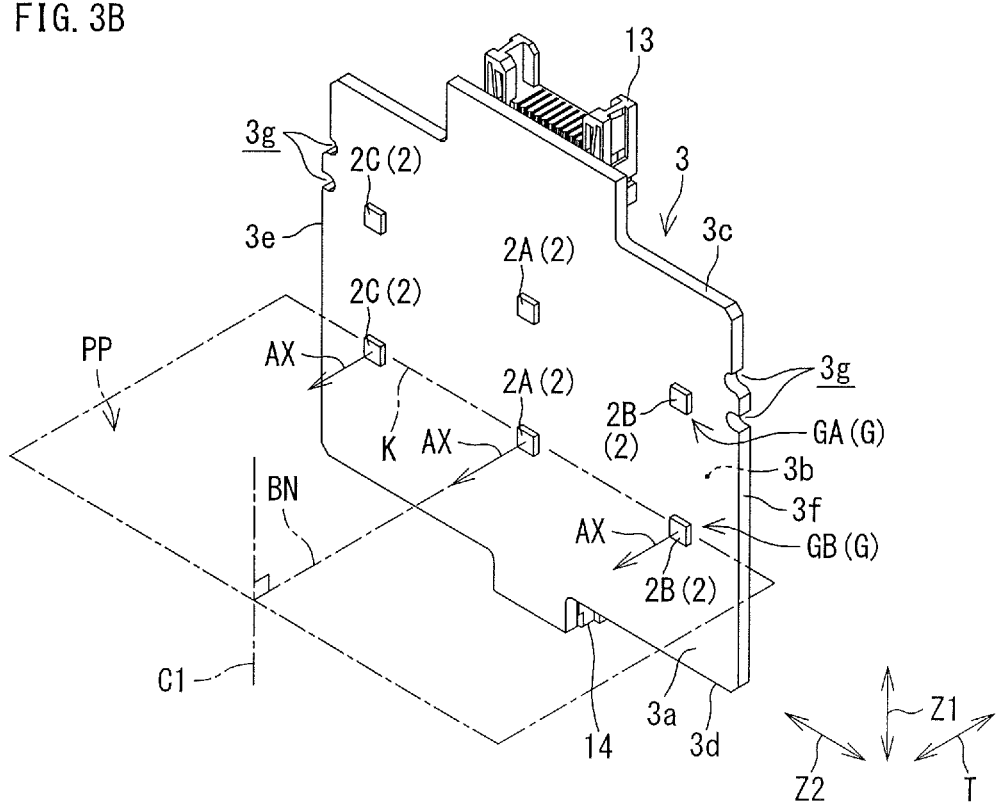

FIG. 3A and FIG. 3B are perspective views of the substrate 3 seen from mutually different angles. As shown in FIG. 3A and FIG. 3B, the substrate 3 is a substantially rectangular thin plate having two sides one of which follows a first direction Z1 and the other one of which follows a second direction Z2, and is formed with a printed-circuit board. The first direction Z1 is placed in parallel with the central axis C1.

A direction perpendicular to the first direction Z1 and to the second direction Z2 is a thickness direction T of the substrate 3. The substrate 3 has both side surfaces in the thickness direction T, and has a front surface 3a and a rear surface 3b that are parallel to the central axis C1. The substrate 3 has a first end portion 3c and a second end portion 3d in the first direction Z1. The first end portion 3c corresponds to an upper end portion, and the second end portion 3d corresponds to a lower end portion. Additionally, the substrate 3 has a first end portion 3e and a second end portion 3f in the second direction Z2.

The substrate 3 is provided with a first connector 13 and a second connector 14 that electrically connect the substrate 3 and the substrate 3 of the adjoining display unit DU together. The first connector 13 and the second connector 14 are connected to a circuit provided on the substrate 3 as a printed-circuit board. In the rear surface 3b of the substrate 3, the first connector 13 is disposed at the first end portion 3c in the first direction Z1, and the second connector 14 is disposed at the second end portion 3d in the first direction Z1. The first connector 13 is connected to the second connector 14 of the substrate 3 of the upwardly adjoining display unit DU. The second connector 14 is connected to the first connector 13 of the substrate 3 of the downwardly adjoining display unit DU.

A pair of latching recess portions 3g arranged at a distance from each other in the first direction Z1 are provided at the first end portion 3e and the second end portion 3f in the second direction Z2 of the substrate 3.

The central LED 2A and the pair of side LEDs 2B, 2C serving as a light source are mounted on each of the front and rear surfaces 3a, 3b of the substrate 3. In other words, the front surface 3a and the rear surface 3b of the substrate 3 are respectively constituents of a disposition surface of the LED 2. In the front surface 3a, the central LED 2A and the pair of side LEDs 2B, 2C are disposed so as to be arranged side by side in the second direction Z2. The central LED 2A is disposed at a center position in the second direction Z2 of the substrate 3, and the pair of side LEDs 2B, 2C are disposed on both sides between which the central LED 2A is interposed.

The central LED 2A of the front surface 3a and the central LED 2A of the rear surface 3b are placed at the same position in the second direction Z2. Additionally, the side LEDs 2B, 2C of the front surface 3a and corresponding side LEDs 2B, 2C of the rear surface 3b are placed at the same positions in the second direction Z2, respectively.

Additionally, in each of the front and rear surfaces 3a, 3b, the central LED 2A and the pair of side LEDs 2B, 2C arranged side by side in the second direction Z2 provide one group G. Another group G including the LEDs arranged side by side in the first direction Z1 is disposed on each of the front and rear surfaces 3a, 3b. Two groups GA and GB are provided in an example shown in the drawing, and yet, without being limited to this, three or more groups G (not shown) may be provided, or only one group G (not shown) may be provided.

The central LED 2A and the side LEDs 2B, 2C will be hereinafter collectively referred to as the LED 2 if necessary.

The central LED 2A of the front and rear surfaces 3a, 3b has a common optical axis AX perpendicular to the front and rear surfaces 3a, 3b. The optical axis AX of the central LED 2A is disposed on a reference normal line BN that is a normal line with respect to the front and rear surfaces 3a, 3b and that extends through the central axis C1.

The pair of side LEDs 2B, 2C of the front surface 3a (or the rear surface 3b) are disposed on both sides between which the central LED 2A is interposed at an even distance from the central LED 2A in an intersection portion K between an orthogonal flat surface PP that includes the reference normal line BN and that is perpendicular to the central axis C1 and the front surface 3a (or the rear surface 3b). Corresponding side LEDs 2B, 2C of the front and rear surfaces 3a, 3b have a common optical axis AX perpendicular to the front and rear surfaces 3a, 3b.

Next, the lens 4 will be described.

Figure 5:
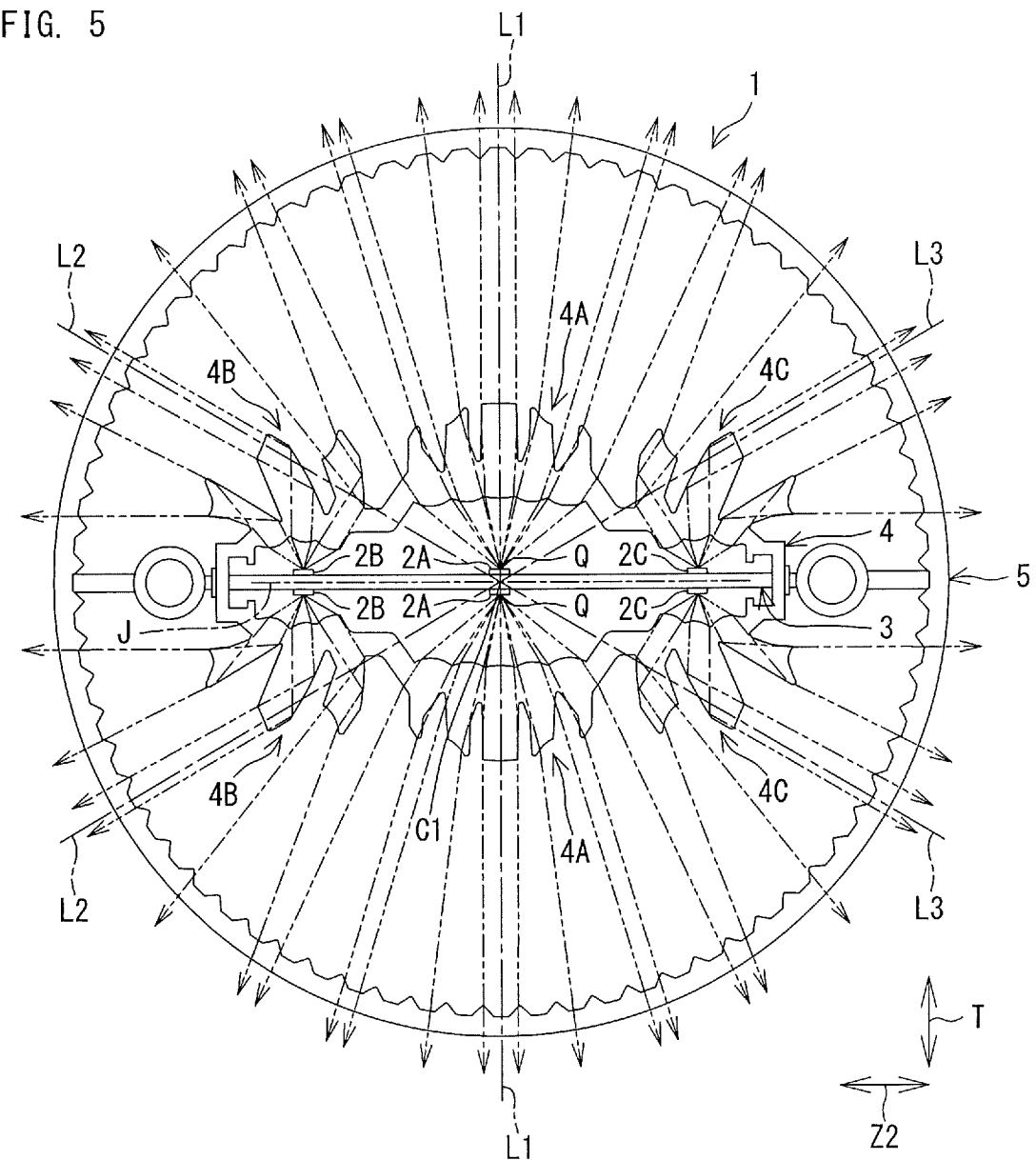
FIG. 5 is a schematic cross-sectional view of the indicator light showing optical paths of radiation light from each LED.
Figure 6A:
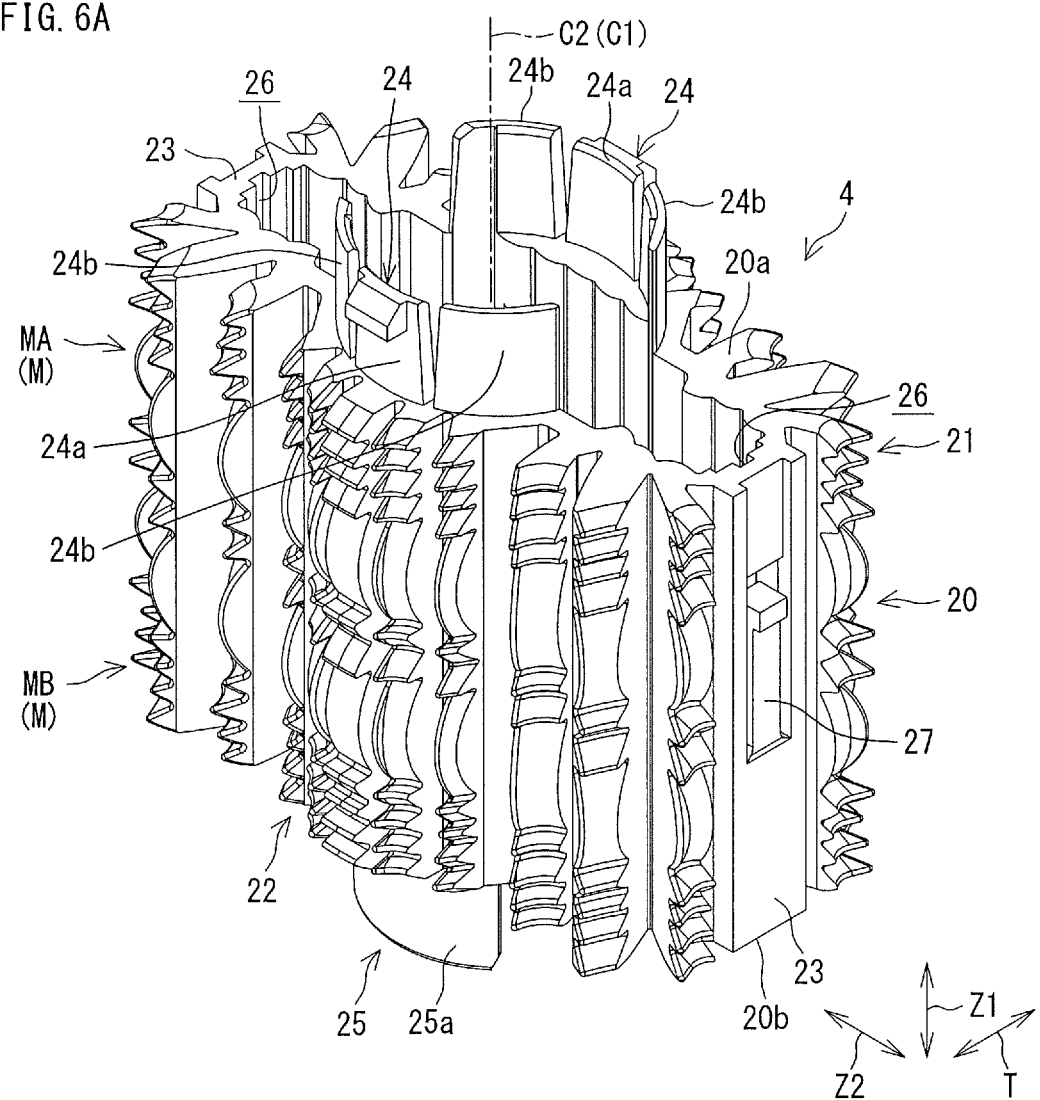
FIG. 6A is a perspective view of a lens.
Figure 6B:
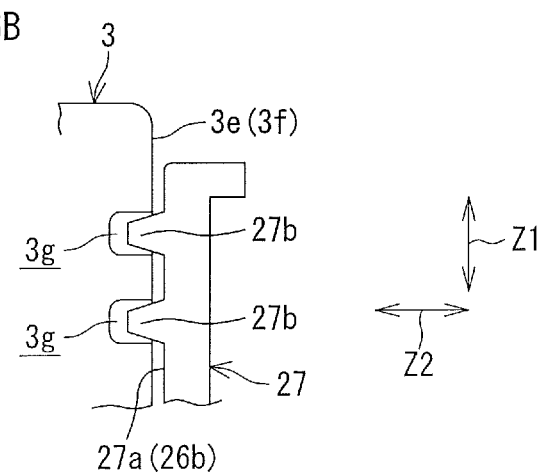
FIG. 6B is a schematic view showing an engaged state between the lens and the substrate.
Figure 7:
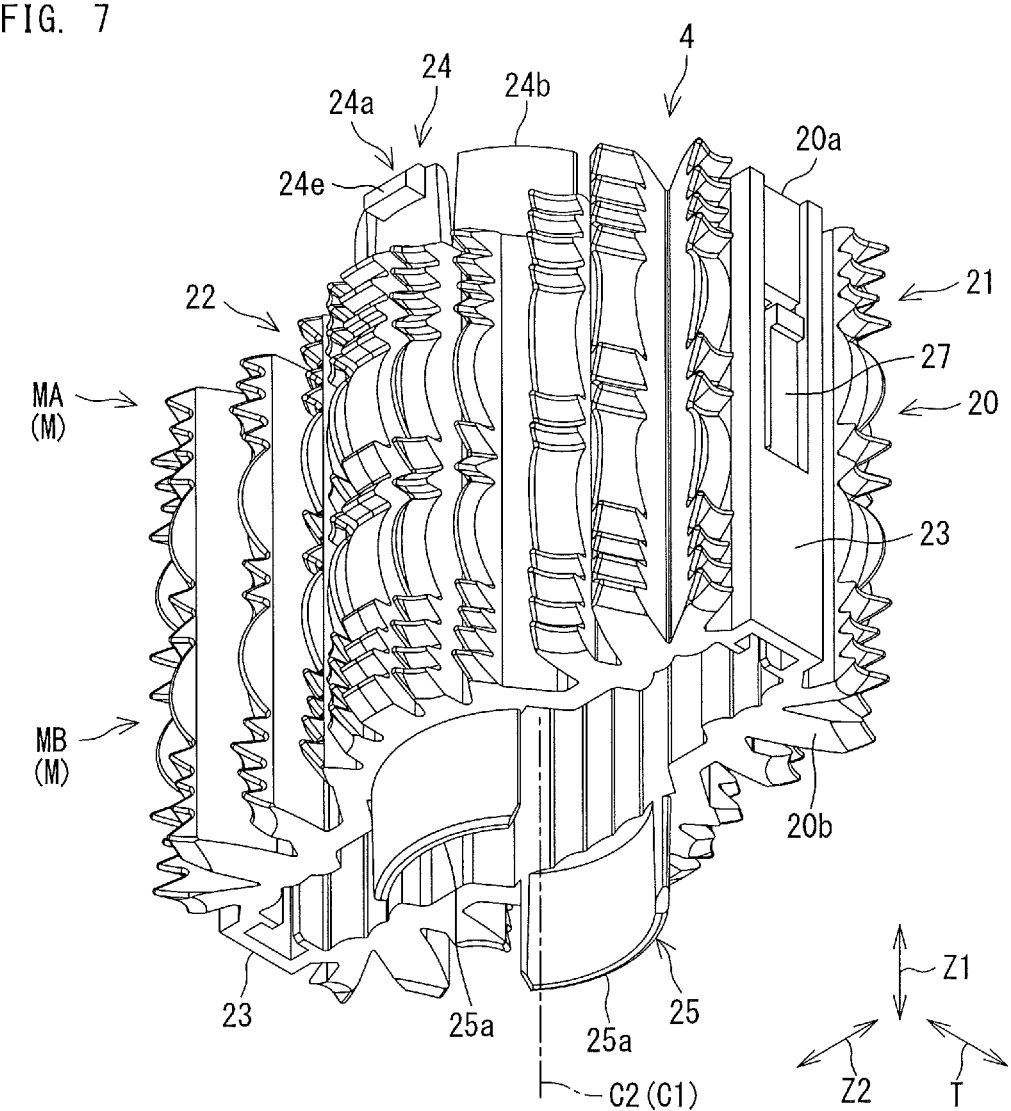
FIG. 7 is a perspective view of the lens seen from another angle.
Figure 9A:
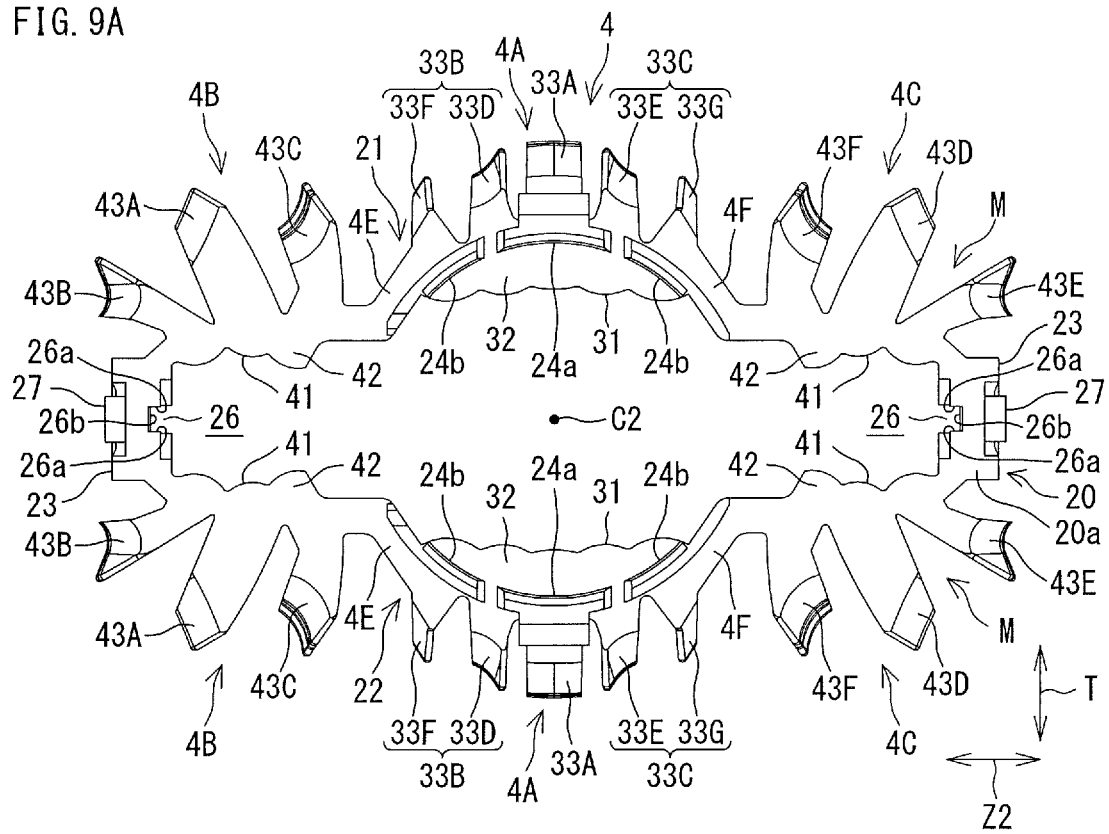
FIG. 9A is a plan view of the lens.
Figure 9B:
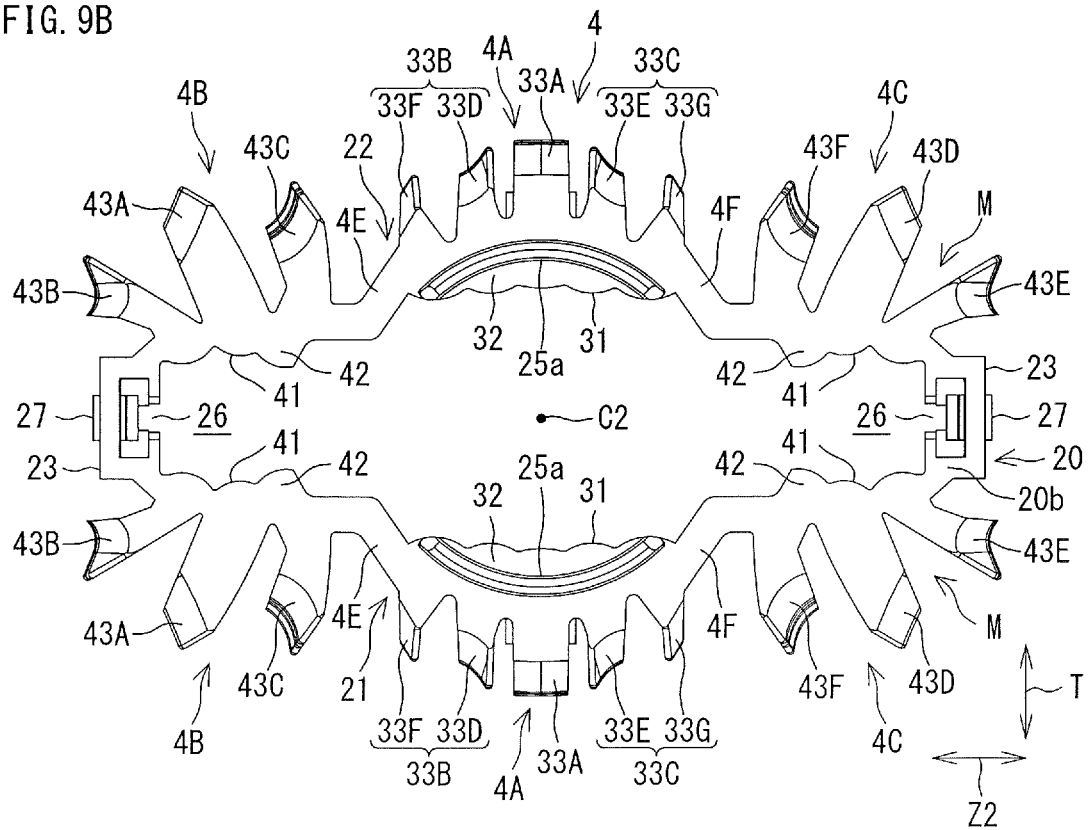
FIG. 9B is a bottom view of the lens.

FIG. 4 is a cross-sectional view of the indicator light 1 showing a radiation angle range from each LED 2. FIG. 5 is a cross-sectional view of the indicator light 1 showing optical paths of radiation light from each LED 2. FIG. 6A is a perspective view of the lens 4, and FIG. 6B is a schematic view showing an engaged state between the lens 4 and the substrate 3. FIG. 7 is a perspective view of the lens 4 seen from another angle. FIG. 8A is a front view of the lens 4, and FIG. 8B is a side view of the lens 4. FIG. 9A is a plan view of the lens 4, and FIG. 9B is a bottom view of the lens 4.

As shown in FIG. 4, the lens 4 has a flat cylindrical shape surrounding the substrate 3, and has a reference axis C2 disposed so as to coincide with the central axis C1 of the globe 5 (see FIG. 2). The lens 4 is molded by use of a mold according to injection molding or the like while using a transparent resin (including a semi-transparent resin or colored transparent resin) (for example, acrylic resin) as a material.

The lens 4 includes a main body portion 20 that has an upper end 20a and a lower end 20b with reference to FIG. 4, FIG. 6A, FIG. 7, FIG. 8A, FIG. 8B, FIG. 9A, and FIG. 9B. The main body portion 20 includes a first portion 21 facing the front surface 3a of the substrate 3, a second portion 22 facing the rear surface 3b of the substrate 3, and a pair of connection portions 23 that connect an end of the first portion 21 and an end of the second portion 22 together. Additionally, the lens 4 includes a first connection portion 24 extended upwardly from the upper end 20a of the main body portion 20 and a second connection portion 25 extended downwardly from the lower end 20b of the main body portion 20.

As shown in FIG. 5, a center position between light-source positions Q of the central LEDs 2A of the front and rear surfaces 3a, 3b is disposed so as to coincide with the central axis C1 when seen in parallel with the central axis C1. In other words, the light sources (the central LED 2A and the side LEDs 2B, 2C) are disposed at line-symmetric positions (light-source positions Q) with respect to a reference line J that extends through the central axis C1 and that is parallel to the front and rear surfaces 3a, 3b of the substrate 3 when seen in parallel with the central axis C1, and the lens 4 has a line-symmetric shape.

As shown in FIG. 8B, each of the first and second portions 21, 22 includes two lens groups MA and MB (which are referred to simply as a lens group M if collectively referred to) that respectively correspond to the two groups GA and GB (see FIG. 3A and FIG. 3B) of the LED 2 of each of the front and rear surfaces 3a, 3b of the substrate 3.

As shown in FIG. 9A and FIG. 9B, each of the lens groups M of the first and second portions 21, 22 has a central lens portion 4A, a pair of side lens portions 4B, 4C, and a pair of inclined connection portions 4E, 4F.

As shown in FIG. 4, a distance D1 from the central LED 2A to a central incidence surface 31 is set to be longer than each distances D2, D3 from each of the side LEDs 2B, 2C to a corresponding side incidence surface 41 (D1>D2, D1>D3). The distances D2, D3 from each of the side LEDs 2B, 2C to the corresponding side incidence surface 41 are set to be equal to each other (D2=D3). The pair of inclined connection portions 4E, 4F are inclined mutually-opposite directions with respect to the front surface 3a (and the rear surface 3b) of the substrate 3 when seen in parallel with the central axis C1.

Next, the connection portion 23 will be described.

As shown in FIG. 9A, a pair of holding grooves 26 extending in the up-down direction is provided inside the pair of connection portions 23, respectively. The pair of holding grooves 26 are fitted into and hold the first and second end portions 3e, 3f, respectively, in the second direction Z2 of the substrate 3 (see FIG. 3B). The substrate 3 is positioned and supported in the thickness direction T by a pair of inner wall surfaces 26a of each of the holding grooves 26. The substrate 3 is positioned and supported in the second direction Z2 by groove bottom surfaces 26b of the pair of holding grooves 26.

Additionally, as shown in FIG. 6A and FIG. 6B, a part of the groove bottom surface 26b of each of the holding grooves 26 is provided by a cantilevered elastic latching piece 27 provided at each of the connection portions 23. As shown in FIG. 6B, the elastic latching piece 27 includes a groove-bottom formation surface 27a that provides a part of the groove bottom surface 26b and a latching projection 27b provided at the groove-bottom formation surface 27a.

The latching projection 27b of the elastic latching piece 27 is elastically latched with the latching recess portion 3g of the first and second end portions 3e, 3f in the second direction Z2 of the substrate 3, and, as a result, the substrate 3 is positioned and supported in the first direction Z1 and in the second direction Z2.

Next, the first connection portion 24 and the second connection portion 25 will be described with reference to FIG. 6A, FIG. 7, FIG. 8A, FIG. 8B, FIG. 9A, and FIG. 9B.

The first connection portion 24 includes a plurality of circular-arc connection pieces that are extended upwardly from the upper end 20a of the main body portion 20 and that are disposed on a circumference whose center is the reference axis C2. Specifically, a group including a central connection piece 24a and a pair of side connection pieces 24b disposed on both sides between which the central connection piece 24a is interposed is provided as two groups disposed on the first portion 21 side and the second portion 22 side, respectively, so as to face each other. The connection pieces of the groups facing each other have a point-symmetric shape with respect to the reference axis C2.

The central connection piece 24a includes a base end 24c that is united with the upper end 20a of the main body portion 20, an extensional end 24d, and an outward projection 24e that protrudes outwardly from the extensional end 24d. The extensional end 24d is elastically bent inwardly with respect to the base end 24c, and the central connection piece 24a is deformable. Thus, the outward projection 24e functions as an elastic hook that surmounts and latches with a peripheral edge portion of the support hole 5d of the end wall portion 5c of the globe 5 (see FIG. 2).

The second connection portion 25 includes two circular-arc connection pieces 25a that are extended downwardly from the lower end 20b of the main body portion 20 and that are disposed on a circumference whose center is the reference axis C2. The two connection pieces 25a are disposed on the first portion 21 side and the second portion 22 side, respectively, so as to face each other.

When the lenses 4 are stacked together as a plurality of stacked lenses, the two connection pieces 25a of the second connection portion 25 of the upper-side lens 4 are respectively fitted to the insides of the connection pieces (the central connection piece 24a and the pair of side connection pieces 24b) of two groups of the first connection portion 24 of the lower-side lens 4.

Next, the central lens portion 4A will be described with reference to FIG. 4, FIG. 10A, and FIG. 10B.

The central lens portion 4A includes a central light incidence portion 32 having a central incidence surface 31 on which light from the corresponding central LED 2A is made incident and a plurality of central light guiding portions 33 that branch from the central light incidence portion 32 in the shape of branches and extend toward the globe 5 side.

The central lens portion 4A allows light from the corresponding central LED 2A to be made incident through the central incidence surface 31, and emits light to a central radiation angle range A1 that is a radiation angle range determined by a central angle centering on the central axis C1 and that centers on a central light-emission reference line L1 along the reference normal line BN.

The plurality of central light guiding portions 33 include a central primary light guiding portion 33A and a pair of central secondary light guiding portions 33B, 33C. The central primary light guiding portion 33A contains the central light-emission reference line L1 and emits parallel emission light HL parallel to the central light-emission reference line L1. The pair of central secondary light guiding portions 33B, 33C are disposed on both sides between which the central primary light guiding portion 33A is interposed when seen in parallel with the central axis C1, and emit diffusion emission light KL that diffuses in the circumferential direction of the globe 5.

The pair of central secondary light guiding portions 33B, 33C include a pair of central adjacent secondary light guiding portions 33D, 33E that are disposed on both sides between which the central primary light guiding portion 33A is interposed and that emit diffusion emission light KL and a pair of central distant secondary light guiding portions 33F, 33G that are disposed on both sides between which the pair of central adjacent secondary light guiding portions 33D, 33E are interposed and that emit diffusion emission light KL.

The central incidence surface 31 includes incidence regions each of which corresponds to each of the central light guiding portions 33. Specifically, the central incidence surface 31 includes an incidence region 31A corresponding to the central primary light guiding portion 33A, incidence regions 31D, 31E each of which corresponds to each of the central adjacent secondary light guiding portions 33D, 33E, and incidence regions 31F, 31G each of which corresponds to each of the pair of central distant secondary light guiding portions 33F, 33G.

Figure 12:
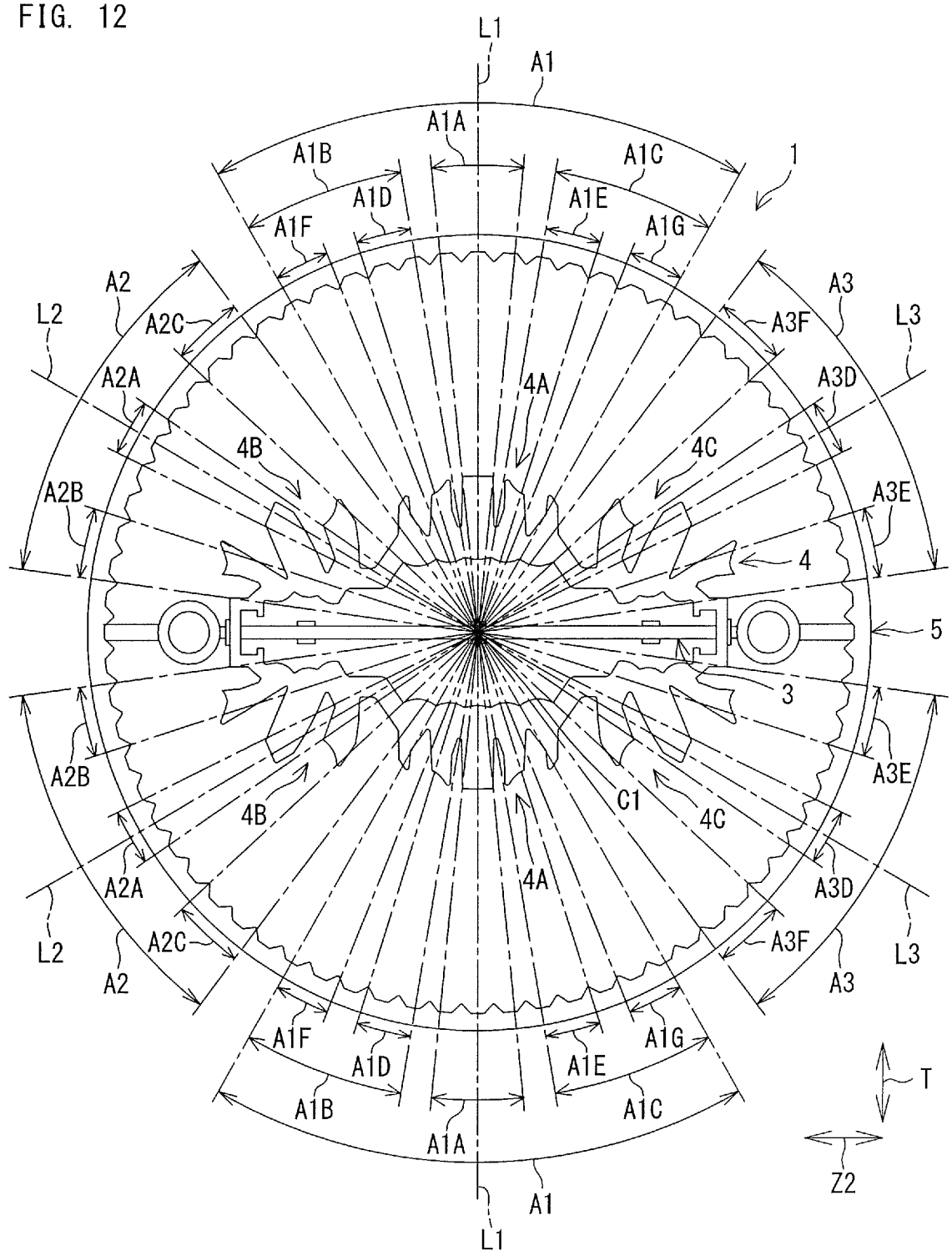
FIG. 12 is a schematic cross-sectional view of the indicator light showing a radiation angle range of each light guiding portion.

As shown in FIG. 12, in the central radiation angle range A1, a pair of regions A1B, A1C corresponding to the pair of central secondary light guiding portions 33B, 33C are disposed on both sides between which a region A1A corresponding to the central primary light guiding portion 33A is interposed. Additionally, in the central radiation angle range A1, a pair of regions A1F and A1G corresponding to the pair of central distant secondary light guiding portions 33F, 33G are disposed on both sides between which a pair of regions A1D, A1E corresponding to the pair of central adjacent secondary light guiding portions 33D, 33E are interposed.

Figure 10A:
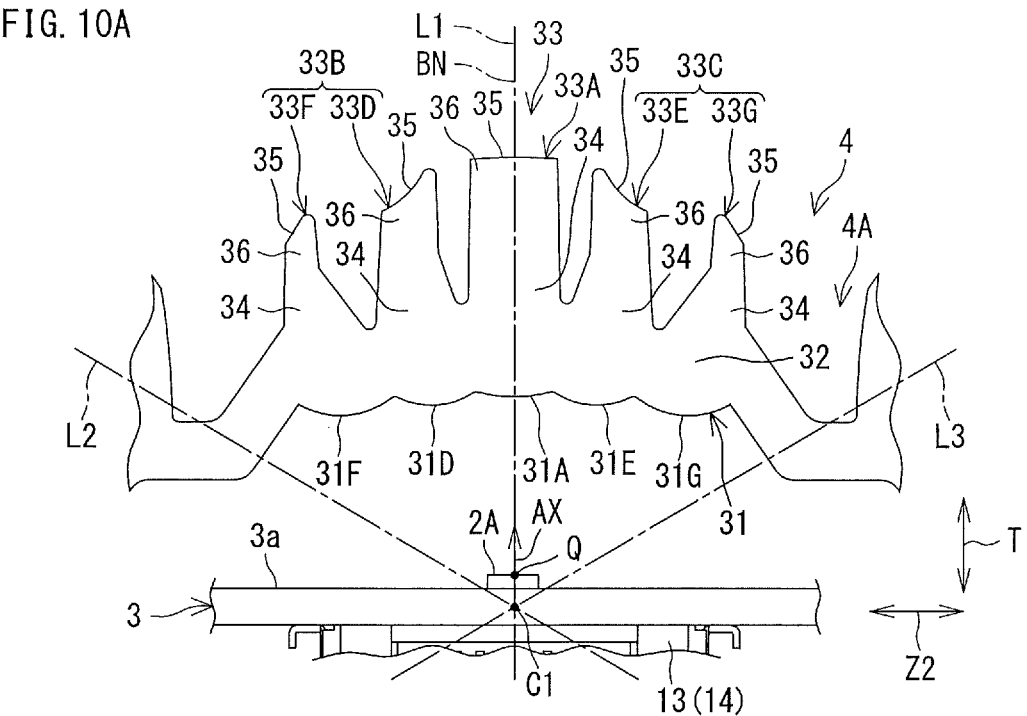
FIG. 10A is a schematic view of a central LED and a central lens portion.
Figure 10B:
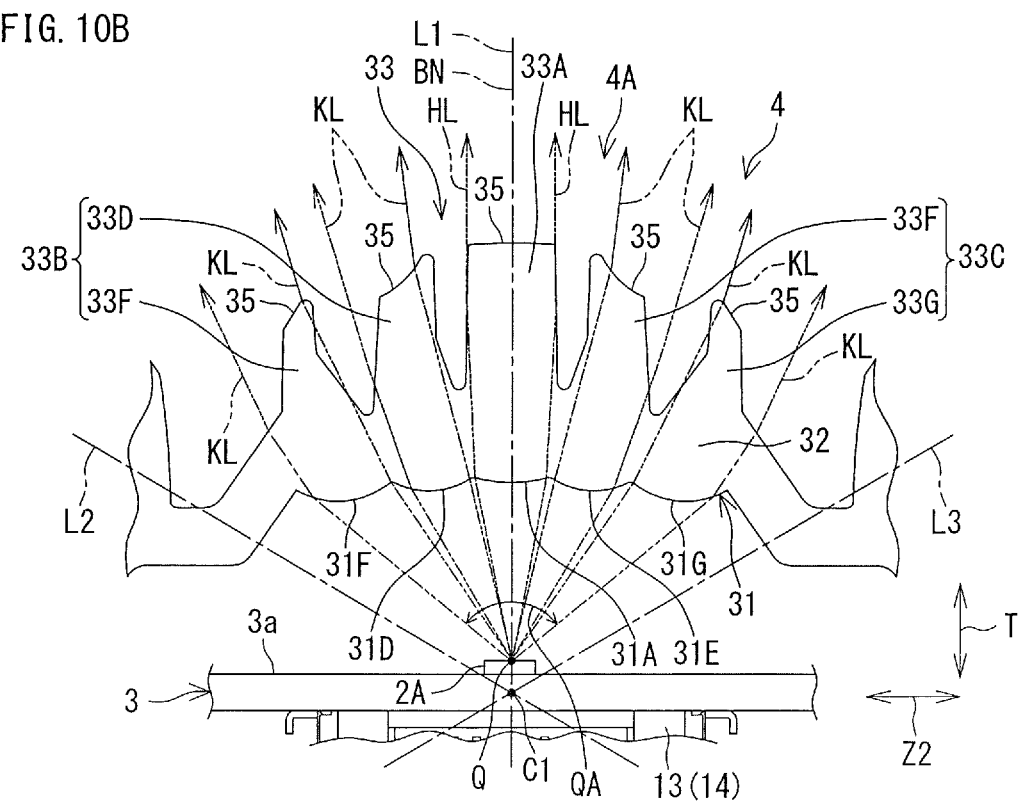
FIG. 10B is a schematic view of the central LED and the central lens portion showing optical paths of radiation light from the central LED.

As shown in FIG. 10A and FIG. 10B, each light guiding portion (the central primary light guiding portion 33A, each of the central adjacent secondary light guiding portions 33D, 33E, and each of the pair of central distant secondary light guiding portions 33F, 33G) forming the central light guiding portion 33 includes a central base end portion 34 united with the central light incidence portion 32 and a central emission end portion 36 having a central emission surface 35 that emits light toward the globe 5 side.

As shown in FIG. 10B, in each of the light guiding portions 33A, 33D, 33E, 33F, and 33G of the central light guiding portion 33, light that has been refracted and has been made incident from the corresponding incidence regions 31A, 31D, 31E, 31F, and 31G of the central incidence surface 31 onto the corresponding central emission surface 35 is refracted and emitted from the corresponding central emission surface 35 toward the corresponding regions A1A, A1D, A1E, A1F, and A1G (see FIG. 12) of the central radiation angle range A1. In other words, in each of the light guiding portions 33A, 33D, 33E, 33F, and 33G of the central light guiding portion 33, light from the central LED 2A is guided and emitted by use of only refraction.

Part of the light that has been refracted and has been made incident on the incidence regions 31D, 31E, 31F, and 31G from the central LED 2A is refracted and emitted from the central base end portion 34 of the corresponding light guiding portions 33D, 33E, 33F, and 33G or from their nearby parts without passing through the central emission surface 35 of the central emission end portion 36 of the corresponding light guiding portions 33D, 33E, 33F, and 33G. Likewise, part of the light that does not pass through the central emission surface 35 is guided and emitted by use of only refraction.

An optical path used until radiation light from the central LED 2A is emitted from the globe 5 through the central lens portion 4A is schematically shown by the alternate long and two short dashed line in FIG. 5. Each of the light guiding portions guides light by use of only refraction in the central lens portion 4A, and therefore it is possible to shorten the length of the optical path from the central LED 2A to the globe 5.

An outer surface (corresponding to the central emission surface 35) of each of the light guiding portions of the central light guiding portion 33 may be formed at a Fresnel lens surface that condenses light in the up-down direction (direction parallel to the central axis C1) (see FIG. 6A).

Next, the pair of side lens portions 4B, 4C will be described with reference to FIG. 4, FIG. 11A, and FIG. 11B.

As shown in FIG. 4, the pair of side lens portions 4B, 4C are formed so as to be mutually line-symmetric with respect to the central light-emission reference line L1 when seen in parallel with the central axis C1. The pair of side lens portions 4B, 4C allow light from the corresponding side LEDs 2B, 2C to be made incident through the side incidence surface 41, and emit the light toward a pair of side radiation angle ranges A2, A3 that contain a pair of side light-emission reference lines L2, L3, respectively, that are inclined in mutually opposite directions at an inclined angle θ1 (θ1=60°) with respect to the central light-emission reference line L1. Each of the side radiation angle ranges A2, A3 is a radiation angle range determined by a central angle centering on the central axis C1.

The central angle of the central radiation angle range A1 and the central angle of each of the side radiation angle ranges A2, A3 may be equal in magnitude to each other, or may be different in magnitude from each other. There is a case in which the central angle of the central radiation angle range A1 and the central angle of each of the side radiation angle ranges A2, A3 are each set at a predetermined angle within the range of not less than 55° and not more than 65°, or at a predetermined angle within the range of not less than 50° and not more than 70°. Additionally, the central radiation angle range A1 and each of the side radiation angle ranges A2, A3 may be at a distance from each other in the circumferential direction on the inner surface of the globe 5, or parts of these radiation angle ranges may overlap with each other on the inner surface of the globe 5. Specifically, there is a case in which the central angle of the central radiation angle range A1 is 70°, and the central angle of each of the side radiation angle ranges A2, A3 is 55° when the central radiation angle range A1 and each of the side radiation angle ranges A2, A3 are at a distance from each other in the circumferential direction on the inner surface of the globe 5.

Figure 11A:
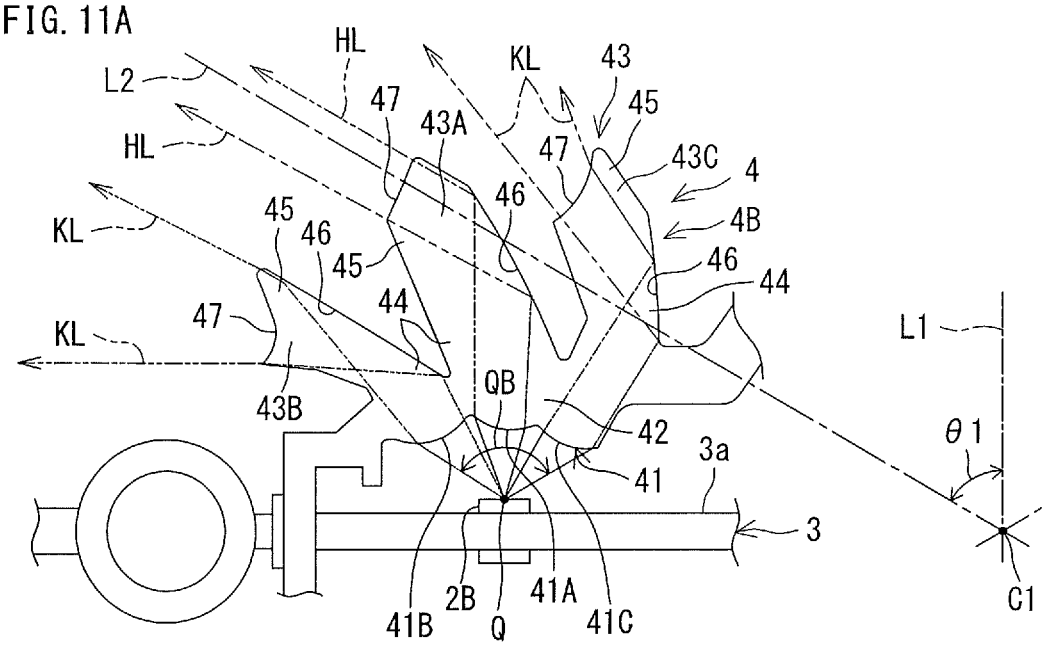
FIG. 11A is a schematic view of a side LED and a side lens portion showing optical paths of radiation light from the side LED.
Figure 11B:
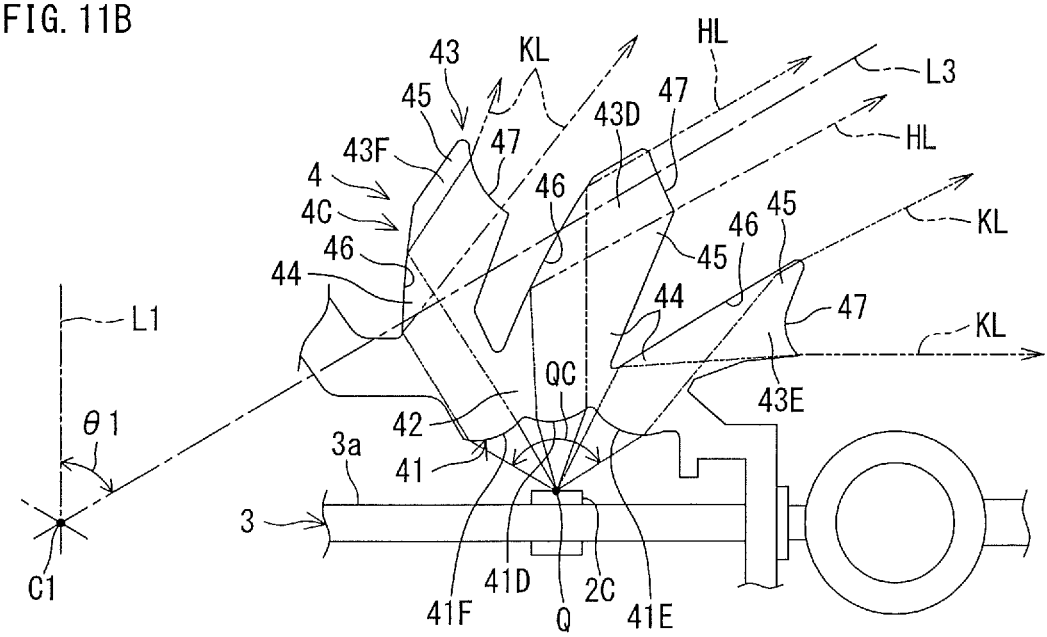
FIG. 11B is a schematic view of the other side LED and the other side lens portion showing optical paths of radiation light from the other side LED.

As shown in FIG. 11A and FIG. 11B, each of the side lens portions 4B, 4C includes a side light incidence portion 42 having the side incidence surface 41 on which light from the corresponding side LEDs 2B, 2C is made incident and a plurality of side light guiding portions 43 that branch from the side light incidence portion 42 in the shape of branches and extend toward the globe 5 side.

A central irradiation angle range QA (corresponding to a central-angle range centering on the light-source position Q; see FIG. 10B) that is an irradiation angle range occupied by the central incidence surface 31 of the irradiation angle range of light from the central LED 2A when seen in parallel with the central axis C1 and side irradiation angle ranges QB, QC (corresponding to a central-angle range centering on the light-source position Q; see FIG. 11A and FIG. 11B) each of which is an irradiation angle range occupied by the corresponding side incidence surface 41 of the irradiation angle range of light from each of the side LEDs 2B, 2C when seen in parallel with the central axis C1 are set to be equal in magnitude to each other.

However, there is a case in which either one of the central irradiation angle range QA and each of the side irradiation angle ranges QB and QC is set at a predetermined magnitude within the range of not less than 90% and not more than 110% of the other one or is set at a predetermined magnitude within the range of not less than 95% and not more than 105% of the other one.

As shown in FIG. 11A, the plurality of side light guiding portions 43 of the side lens portion 4B, which is one of the pair of side lens portions, include a side primary light guiding portion 43A and a pair of side secondary light guiding portions 43B, 43C. The side primary light guiding portion 43A contains the corresponding side light-emission reference line L2, and emits parallel emission light HL parallel to the corresponding side light-emission reference line L2. The pair of side secondary light guiding portions 43B, 43C are disposed on both sides between which the corresponding side primary light guiding portion 43A is interposed when seen in parallel with the central axis C1, and emit diffusion emission light KL that diffuses in the circumferential direction of the globe 5.

As shown in FIG. 12, in the side radiation angle range A2, a pair of regions A2B, A2C corresponding to the pair of side secondary light guiding portions 43B, 43C (see FIG. 11A) are disposed on both sides between which the region A1A corresponding to the side primary light guiding portion 43A is interposed.

As shown in FIG. 11B, the plurality of side light guiding portions 43 of the other side lens portion 4C include a side primary light guiding portion 43D and a pair of side secondary light guiding portions 43E, 43F. The side primary light guiding portion 43D contains a corresponding side light-emission reference line L3, and emits parallel emission light HL parallel to the corresponding side light-emission reference line L3. The pair of side secondary light guiding portions 43E, 43F are disposed on both sides between which the corresponding side primary light guiding portion 43D is interposed when seen in parallel with the central axis C1, and emit diffusion emission light KL that diffuses in the circumferential direction of the globe 5.

As shown in FIG. 12, in the side radiation angle range A3, a pair of regions A3E, A3F corresponding to the pair of side secondary light guiding portions 43E, 43F (see FIG. 11B) are disposed on both sides between which a region A3D corresponding to the side primary light guiding portion 43D is interposed.

As shown in FIG. 11A and FIG. 11B, each of the side light guiding portions 43 (43A to 43F) includes a side base end portion 44, a side emission end portion 45, and a light-guide reflection surface 46. The side base end portion 44 is united with the side light incidence portion 42. The side emission end portion 45 has a side emission surface 47 that emits light toward the globe 5 side.

The light-guide reflection surface 46 guides light that has been made incident on the side base end portion 44 from the corresponding incidence regions 41A, 41B, 41C, 41D, 41E, and 41F of the corresponding side incidence surface 41 to the side emission end portion 45 while performing internal reflection. The light-guide reflection surface 46 is an internal reflection surface provided at a back surface of an outer surface on the central axis C1 side of a pair of outer surfaces of each of the branched side light guiding portions 43 (43A to 43F).

An optical path used until radiation light from each of the side LEDs 2B, 2C is emitted from the globe 5 through the corresponding side lens portions 4B, 4C is schematically shown by the alternate long and two short dashed line in FIG. 5. Each of the light guiding portions guides light by use of reflection in each of the side lens portions 4B, 4C, and therefore it is possible to lengthen the length of the optical path from each of the side LEDs 2B, 2C to the globe 5.

An outer surface (corresponding to the side emission surface 47) of each of the light guiding portions of the side light guiding portion 43 may be formed at a Fresnel lens surface that condenses light in the up-down direction (direction parallel to the central axis C1) (see FIG. 6A).

With the indicator light 1 of the present preferred embodiment, the following effects are exerted.

That is, as shown in FIG. 4, the central LED 2A and the pair of side LEDs 2B, 2C are used, and, as a result, it becomes possible to emit light having high light intensity. On the other hand, the distance from the central LED 2A to the globe 5 is longer than the distance from the side LEDs 2B, 2C to the cylindrical globe 5, and therefore the light intensity of the central radiation angle range A1 is liable to become lower than the light intensity of the side radiation angle ranges A2, A3. Therefore, in the indicator light 1, radiation light from the central LED 2A is emitted to the central radiation angle range A1 by use of only refraction by each of the central light guiding portions 33 (see FIG. 5 and FIG. 10B). Therefore, it is possible to bring the length of the optical path from the central LED 2A to the globe 5 close to the length of the optical path from the side LEDs 2B, 2C to the globe 5 by shortening the length of the optical path from the central LED 2A to the globe 5. This makes it possible to emit light that is uniform and bright with respect to the circumferential direction.

Additionally, as shown in FIG. 4 and FIG. 10A, radiation light from the central LED 2A is emitted to the central radiation angle range A1 through the central lens portion 4A. The central lens portion 4A includes the plurality of central light guiding portions 33 that branch from the central light incidence portion 32 in the shape of branches, and the plurality of central light guiding portions 33 include the central primary light guiding portion 33A and the pair of central secondary light guiding portions 33B, 33C on both sides of the central primary light guiding portion 33A. This makes it possible to raise light intensity and to emit light uniformly with respect to the circumferential direction in the central radiation angle range A1.

As shown in FIG. 4 and FIG. 12, in the central radiation angle range A1, the pair of regions A1B, A1C corresponding to the pair of central secondary light guiding portions 33B, 33C are disposed on both sides between which the region A1A corresponding to the central primary light guiding portion 33A is interposed. Therefore, radiation light from the central LED 2A is excellently distributed into the central radiation angle range A1.

Additionally, the pair of central secondary light guiding portions 33B, 33C include the pair of central adjacent secondary light guiding portions 33D, 33E and the pair of central distant secondary light guiding portions 33F, 33G. This makes it possible to equalize the thickness of each of the secondary light guiding portions 33D, 33E, 33F, 33G that are formed in the shape of branches when seen in parallel with the central axis C1, and makes it possible to improve moldability.

Additionally, as shown in FIG. 4, radiation light from each of the side LEDs 2B, 2C is emitted to the corresponding side radiation angle ranges A2, A3 through the corresponding side lens portions 4B, 4C. Additionally, as shown in FIG. 11A and FIG. 11B, each of the side light guiding portions 43 of each of the side lens portions 4B, 4C guides light by use of internal reflection by means of the light-guide reflection surface 46. Therefore, as shown in FIG. 5, it is possible to lengthen an optical path length from each of the side LEDs 2B, 2C to the globe 5 through the corresponding side lens portions 4B, 4C. As a result, it is possible to reduce a difference in optical path length at the center and the side with respect to the optical path length from the LED 2 to the globe 5. This makes it possible to emit light uniformly with respect to the circumferential direction.

Additionally, as shown in FIG. 11A and FIG. 11B, the side light guiding portion 43 of each of the side lens portions 4B, 4C includes the side primary light guiding portions 43A, 43D that emit parallel emission light HL parallel to the corresponding side light-emission reference lines L2, L3 and the pair of side secondary light guiding portions 43B, 43C; 43E, 43F that are disposed on both sides between which the corresponding side primary light guiding portions 43A, 43D are interposed and that emit diffusion emission light KL that is diffused in the circumferential direction of the globe 5. Therefore, as shown in FIG. 5, radiation light from each of the side LEDs 2B, 2C is excellently distributed into the corresponding side radiation angle ranges A2, A3.

Additionally, as shown in FIG. 4, the distance D1 from the central LED 2A to the central incidence surface 31 is made longer than the distances D2, D3 from each of the side LEDs 2B, 2C to the corresponding side incidence surface 41. The lens 4 includes the pair of inclined connection portions 4E, 4F that connect the central light incidence portion 32 and each of the side light incidence portions 42 together and that are inclined in mutually opposite directions with respect to the disposition surface (the front surface 3a and the rear surface 3b) when seen in parallel with the central axis C1. Therefore, it is possible to integrally form a configuration in which distances from each of the LEDs 2A, 2B, 2C to the corresponding lens portions 4A, 4B, 4C (incidence surfaces 31, 41) are made different from each other at the center and the side. Additionally, it becomes possible to house and dispose a part of the surface-mounted components of the substrate 3, e.g., apart of the connectors 13, 14, etc., between the central lens portion 4A and the substrate 3.

Additionally, the central irradiation angle range QA (see FIG. 10B) corresponding to the central LED 2A and the side irradiation angle ranges QB, QC (see FIG. 11A and FIG. 11B) corresponding to each of the side LEDs 2B, 2C are set to be equal in magnitude to each other, and, as a result, it is possible to emit light uniformly in the circumferential direction by effectively using radiation light from each of the LEDs 2A, 2B, 2C. This is effective to achieve uniform light emission in the circumferential direction particularly in a case in which the distance D1 from the central LED 2A to the central incidence surface 31 is made longer than the distances D2, D3 from each of the side LEDs 2B, 2C to the corresponding side incidence surface 41.

Additionally, as shown in FIG. 5, the light source (the LED 2) is disposed at a line-symmetric position with respect to the reference line J that passes through the central axis C1 and that is parallel to the pair of disposition surfaces (the front and rear surfaces 3a, 3b) when seen in parallel with the central axis C1, and the lens 4 has a line-symmetric shape with respect to the reference line J. Therefore, it is possible to realize an indicator light 1 that evenly emits light in all directions while using a practicable configuration.

Additionally, as shown in FIG. 12, in a case in which the central radiation angle range A1 and each of the side radiation angle ranges A2, A3 are at a distance from each other in the circumferential direction around the central axis C1, it is possible to suitably apply the present invention to a pseudo-rotating lamp in which the LEDs 2 adjoining to each other in the circumferential direction of the central axis C1 are controllably turned on and off in a sequential order.

Figure 13:
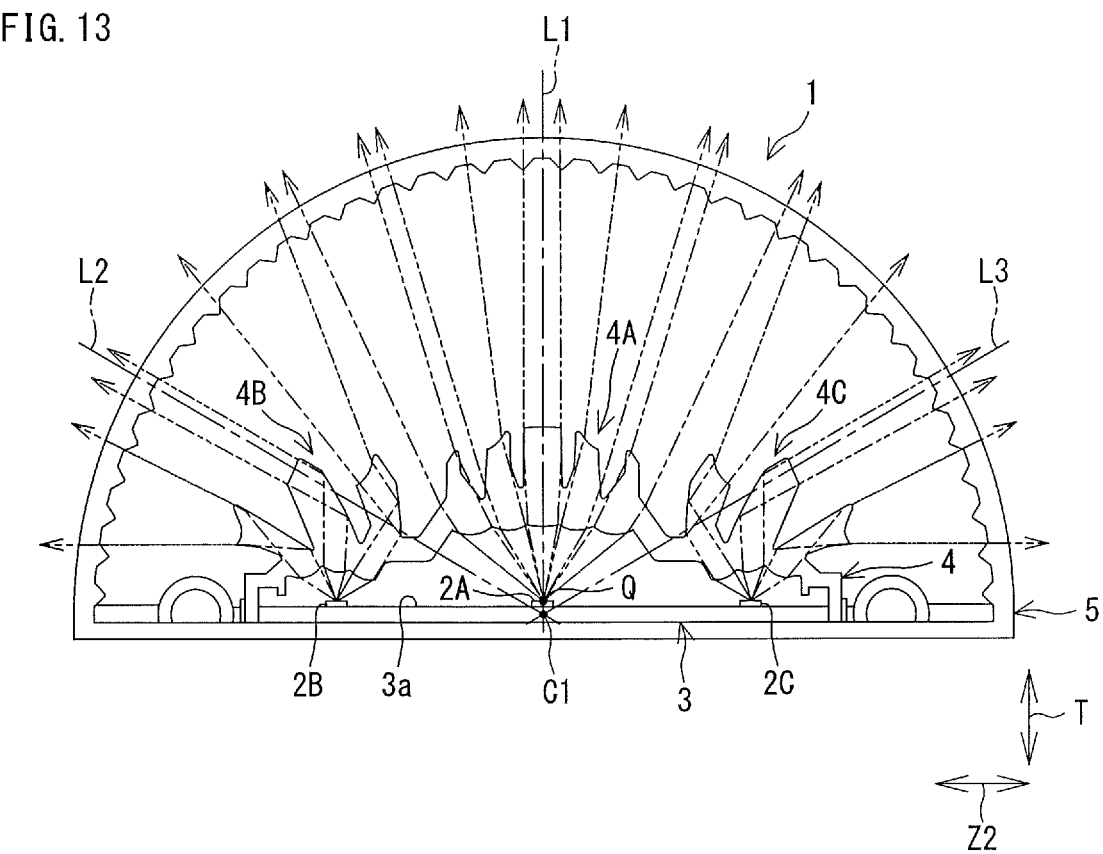
FIG. 13 is a schematic cross-sectional view of an indicator light according to another preferred embodiment of the present invention.

FIG. 13 is a schematic cross-sectional view of an indicator light 1 according to another preferred embodiment of the present invention. As shown in FIG. 13, the globe 5 has a partially cylindrical shape in which the front surface 3a of the substrate 3 (disposition surface) serves as a chord when seen in parallel with the central axis C1. It is possible to suitably apply the present preferred embodiment to an indicator light that evenly emits light to a range of 180°.

The present invention is not limited to the preferred embodiments mentioned above, and can make various changes within the scope of the subject matter recited in the appended claims.

REFERENCE SIGNS LIST

1 Indicator light
2 LED (light source)
2A Central LED
2B Side LED
2C Side LED
3 Substrate (support member)
3a Front surface (disposition surface)
3b Rear surface (disposition surface)
4 Lens
4A Central lens portion
4B Side lens portion
4C Side lens portion
4E Inclined connection portion
4F Inclined connection portion
5 Globe
13 First connector
14 Second connector
20 Main body portion
21 First portion
22 Second portion
23 Connection portion
24 First connection portion
25 Second connection portion
31 Central incidence surface
31A, 31D, 31E, 31F, 31G Incidence region
32 Central light incidence portion
33 Central light guiding portion
33A Central primary light guiding portion
33B Central secondary light guiding portion
33C Central secondary light guiding portion
33D Central adjacent secondary light guiding portion
33E Central adjacent secondary light guiding portion
33F Central distant secondary light guiding portion
33G Central distant secondary light guiding portion
35 Central emission surface
36 Central emission end portion
41 Side incidence surface
41A, 41B, 41C, 41D, 41E, 41F Incidence region
42 Side light incidence portion
43 Side light guiding portion
43A Side primary light guiding portion
43B Side secondary light guiding portion
43C Side secondary light guiding portion
43D Side primary light guiding portion
43E Side secondary light guiding portion
43F Side secondary light guiding portion
45 Side emission end portion
46 Light-guide reflection surface
47 Side emission surface
A1 Central radiation angle range
A1A, A1B, A1C, A1D, A1E, A1F, A1G Region
A2 Side radiation angle range
A2A, A2B, A2C Region
A3 Side radiation angle range
A3D, A3E, A3F Region
AX Optical axis
BN Reference normal line
BU Base unit
C1 Central axis
D1, D2, D3 Distance
DU Display unit
J Reference line
K Intersection portion
L1 Central light-emission reference line
L2 Side light-emission reference line
L3 Side light-emission reference line
PP Orthogonal flat surface
Q Light-source position
QA Central irradiation angle range
QB Side irradiation angle range
QC Side irradiation angle range
θ1 Inclined angle

The invention claimed is:

1. An indicator light that radially emits light away from a central axis toward a periphery of the central axis, the indicator light comprising:
a support member including a disposition surface parallel to the central axis;
a light source including a central LED and a pair of side LEDs ;
a lens including a central lens portion and a pair of side lens portions; and
a cylindrical or a partially cylindrical translucent globe that surrounds the support member and the lens and that centers on the central axis; wherein
the central LED is disposed on a reference normal line that is a normal line with respect to the disposition surface in the disposition surface and that extends through the central axis;
the central LED includes an optical axis perpendicular to the disposition surface;
the pair of side LEDs are disposed on both sides between which the central LED is interposed at mutually equal distances from the central LED in an intersection portion between an orthogonal flat surface that includes the reference normal line and that is perpendicular to the central axis and the disposition surface;

the pair of side LEDs include an optical axis perpendicular to the disposition surface;

the central lens portion allows light from the central LED to be made incident and emits light into a central radiation angle range that is a radiation angle range determined by a central angle centering on the central axis and that centers on a central light-emission reference line along the reference normal line;

the pair of side lens portions include side incidence surfaces, respectively, on which radiation light from the corresponding side LED is made incident and emit light into a pair of side radiation angle ranges, respectively, containing a pair of side light-emission reference lines, respectively, that are inclined mutually opposite directions at an inclined angle of 60° with respect to the central light-emission reference line on the orthogonal flat surface;

the central lens portion includes a central light incidence portion having a central incidence surface on which light from the central LED is made incident and a plurality of central light guiding portions that branch from the central light incidence portion in a shape of branches and that extend toward a side of the globe in the central radiation angle range, and each of the central light guiding portions includes a central emission end portion having a central emission surface that emits light to the side of the globe in the central radiation angle range, and in each of the central light guiding portions, light that has been refracted and has been made incident from a corresponding incidence region of the central incidence surface onto the corresponding central emission surface is refracted and emitted from the corresponding central emission surface toward a corresponding region of the central radiation angle range.

2. The indicator light according to claim 1, wherein the plurality of central light guiding portions include:
a central primary light guiding portion that contains the central light-emission reference line and that emits emission light parallel to the central light-emission reference line; and
a pair of central secondary light guiding portions that are disposed on both sides between which the central primary light guiding portion is interposed when seen in parallel with the central axis and that emit diffusion emission light that is diffused in a circumferential direction of the globe.

3. The indicator light according to claim 2, wherein, in the central radiation angle range, a pair of regions corresponding to the pair of central secondary light guiding portions are disposed on both sides between which a region corresponding to the central primary light guiding portion is interposed.

4. The indicator light according to claim 3, wherein the pair of central secondary light guiding portions include a pair of central adjacent secondary light guiding portions disposed on both sides between which the central primary light guiding portion is interposed and a pair of central distant secondary light guiding portions disposed on both sides between which the pair of central adjacent secondary light guiding portions are interposed, and,
in the central radiation angle range, a pair of regions corresponding to the pair of central distant secondary light guiding portions are disposed on both sides between which a region corresponding to the pair of central adjacent secondary light guiding portions is interposed.

5. The indicator light according to claim 1, wherein each of the side lens portions includes a side light incidence portion having the side incidence surface on which light from the corresponding side LED is made incident and a plurality of side light guiding portions that branch from the side light incidence portion and that extend toward the globe in the corresponding side radiation angle range, and
each of the side light guiding portions includes a side base end portion that is united with the corresponding side light incidence portion, a side emission end portion having a side emission surface that emits light to the side of the globe in the corresponding side radiation angle range, and a light-guide reflection surface that guides light that has been made incident on the side base end portion from a corresponding incidence region of the corresponding side incidence surface onto the side emission end portion while performing internal reflection.

6. The indicator light according to claim 5, wherein the plurality of side light guiding portions include:
a side primary light guiding portion that contains the corresponding side light-emission reference line and that emits emission light parallel to the corresponding side light-emission reference line; and
a pair of side secondary light guiding portions that are disposed on both sides between which the corresponding side primary light guiding portion is interposed when seen in parallel with the central axis and that emit diffusion emission light that is diffused in the circumferential direction of the globe.

7. The indicator light according to claim 5, wherein a distance from the central LED to the central incidence surface is made longer than a distance from each of the side LEDs to the corresponding side incidence surface, and
the lens includes a pair of inclined connection portions that connect the central light incidence portion and each of the side light incidence portions together and that are inclined mutually-opposite directions with respect to the disposition surface when seen in parallel with the central axis.

8. The indicator light according to claim 5, wherein a central irradiation angle range that is an irradiation angle range occupied by the central incidence surface of an irradiation angle range of light from the central LED and a side irradiation angle range that is an irradiation angle range occupied by the corresponding side incidence surface of an irradiation angle range of light from each of the side LEDs are set to be equal in magnitude to each other when seen in parallel with the central axis.

9. The indicator light according to claim 1, wherein the support member includes a substrate that has a pair of disposition surfaces in mutually-opposite directions on a front and a rear of the substrate, and
the light source is disposed at a line-symmetric position with respect to a reference line that extends through the central axis and that is parallel to the pair of disposition surfaces when seen in parallel with the central axis, and
the lens is formed in a line-symmetric shape with respect to the reference line.

10. The indicator light according to claim 1, wherein the central radiation angle range and each of the side radiation angle ranges are away from each other in the circumferential direction around the central axis.

11. The indicator light according to claim 1, wherein the globe has a partially cylindrical shape in which the disposition surface serves as a chord when seen in parallel with the central axis.

* * * * *